United States Patent [19]

Kral et al.

[11] 4,008,814

[45] Feb. 22, 1977

[54] CRANE WITH A GRIPPING DEVICE FOR HANDLING SLABS

[76] Inventors: Leopold Kral, Am Flutgraben 64, 5000 Cologne 80; Klaus-Günter Finke, Birkenweg 16, 4019 Monheim; Theo Webers, Friedrich-List-Str. 5, 403 Ratingen, all of Germany

[22] Filed: Jan. 31, 1975

[21] Appl. No.: 545,979

[30] Foreign Application Priority Data

Feb. 6, 1974 Germany .......................... 2405601

[52] U.S. Cl. .......................... 214/16 B; 294/67 BC; 294/81 R; 212/14; 212/125; 214/654

[51] Int. Cl.² .......................................... B65G 47/00

[58] Field of Search ............ 214/16 B, 16.4 A, 654, 214/1 S, 1 SW, 1 R; 294/81 R, 67 AB, 67 R, 67 A, 63 R, 67 AA, 67 B, 67 BB, 67 BC, 67 DA, 106, 87 R; 212/5, 10, 13, 18, 14, 124, 129

[56] References Cited

UNITED STATES PATENTS

| | | | |
|---|---|---|---|
| 1,730,128 | 10/1929 | Drake | 294/67 BC |
| 1,765,023 | 6/1930 | McWane | 294/67 BC |
| 2,040,574 | 5/1936 | Sutcliffe | 294/63 R |
| 3,467,264 | 9/1969 | Armington et al. | 214/750 X |
| 3,734,312 | 5/1973 | Hickinbotham | 214/16.4 A |
| 3,749,437 | 7/1973 | Lynn | 294/67 AA |
| 3,838,779 | 10/1974 | Dawson | 214/1 S |

*Primary Examiner*—Robert J. Spar
*Assistant Examiner*—R. B. Johnson
*Attorney, Agent, or Firm*—John J. Dennemeyer

[57] ABSTRACT

A gripping device for lifting and depositing slabs which are disposed on one edge thereof in an upright position is mounted in a mobile crane which is displaceable across a plurality of such slabs and comprises a row of support rods which are vertically displaceable in unison and each of which is provided at its lower end with a support member which is selectively rotatable into a position in which, when the rods are lowered into a position adjacent one side of a slab, the support member engages under the lower edge of the slab, and into another position in which it is disengaged from the said edge; furthermore a gravity operated holder member is provided which comes into engagement with the upper edge of the slab while the support rods are being lowered, and secures the slab against tilting during lifting and conveyance thereof.

7 Claims, 7 Drawing Figures

26a
30
7
26
28
9
25a
29
25
27

9
16
7
20
21
21b
23
20a
12

16

16
17
17a 13
21
9
16
18
7
12
14
15
IV
IV

CRANE WITH A GRIPPING DEVICE FOR HANDLING SLABS

This invention relates to a gripping device for handling slabs disposed on one edge thereof in an upright position.

Known gripping devices of this kind comprise a pocket which engages over slab and which is closable at its lower end by a latch member which engages under the slab to serve as a support while the slab is lifted out of a storage compartment (German Utility Model No. 7244578).

Furthermore, gripping devices provided with twin pockets are known for depositing one slab and for receiving an adjacent slab on the return stroke (German Utility Model No. 7144112).

These gripper pockets have the disadvantage that the slabs must be carefully inserted into the pockets during the lowering of the gripping device since the width of the pockets cannot be freely selected in view of the small mutual spacings of the stored slabs. Also, thin slabs may assume an oblique position in the compartments of the storage frame, and when two adjacent slabs assume such a mutually inclined position it is hardly possible to introduce a side wall of a gripper pocket between the two slabs. Also drive means for the latch members which are pivotal about a horizontal axis require space for a vertical adjuster rod.

The invention is based on the problem of providing a gripping device wherein the slabs are prevented from tilting during transport by other means than double walled pockets which completely enclose the slabs to be received.

This problem is solved by the invention which consists in a gripping device for lifting and depositing slabs disposed on one edge thereof in an upright position, said device mounted in a mobile crane displaceable across a plurality of such slabs, said device comprising a plurality of support rod means disposed in a row at spaced locations on an elongate bridge means vertically displaceable relative to said crane, said support rod means extending downwardly from said bridge means, each support rod means having a lower end provided with a support member laterally projecting therefrom, means for vertically displacing said bridge means together with said support rod means, means for rotating each of said support means to displace said support member thereof into a selected one of two end positions permitting respectively engagement with and disengagement from a lower edge portion of a slab disposed in operation adjacent said row of support rod means, and a gravity operated holder means for engagement with an upper edge portion of said slab upon lowering of said support rod.

In the gripping device according to the invention, the pockets known heretofore are omitted and simple support rods are substituted therefor which carry at the lower end controllable support members which may be, e.g., in the form of pivotal dogs, which can always enter into the spaces between adjacent slabs. The support members which cannot be supported in the manner of latching members must obviously be constructed in a suitably rigid form. Holding the received slabs safely without risk of tilting is effected by at least one gravity operated holder member which upon lowering the bridge structure with the gripper elements engages the upper narrow limiting surface of a slab so that the latter is correctly located between the lower support members and at least one upper holder member. The holder member or members has or have suitably downwardly directed projections which embrace a slab at the free surface thereof which is remote from the support rods. Protection against tilting towards the other side is provided by the support rods themselves.

The controllable support members are preferably rigidly disposed on the support rods in a cantilever-like manner, the support rods being mounted in the bridge structure and rotatably adjustable. Thereby the support members can be constructed in a particularly strong manner and moreover they can also be adjusted to a position parallel to the plane of the slabs so that they do not hinder the lowering of the support rods between adjacent slabs.

In order that a slab can be deposited and an adjacent slab can be received during the return stroke of the bridge structure, each support rod is provided with a cantilever-like support member and is rotatably adjustable through 180°, the holder member having a dimension transverse to the slabs which extend over two adjacent slabs and being mirror-symmetrically shaped relatively to the line of disposition of the support rods. Such a holder member supports the one slab during deposition and the adjacent slab during reception thereof in an upright position provided that both slabs have approximately the same stored height. If different heights of the stored slabs must be taken into account it is advisable that a holder member is provided for each slab, the holder members being mutually mirror-symmetrically disposed at the lower end of a respective slide rod which is axially displaceable in the bridge structure at the spacing of adjacent slabs. In this manner, each holder member can be deposited on a slab independent of the relative height of two adjacent slabs. For depositing a slab and lifting an adjacent slab during the return stroke it is advisable that the support rods are each provided with two support members at an angle of 90°, in which case the support rods must be rotatably adjustable only through 90°. This is more favorable from a drive point of view. In this construction also the holder member must have a dimension transverse to the slabs which extends over two adjacent slabs, and must be shaped in a mirror-symmetrical manner relative to the line of disposition of the support rods; alternatively the construction having the two independently adjustable holder members may be utilized.

Two constructional examples of a gripping device according to the invention are described below with reference to the accompanying drawings, in which.

Figure 1:
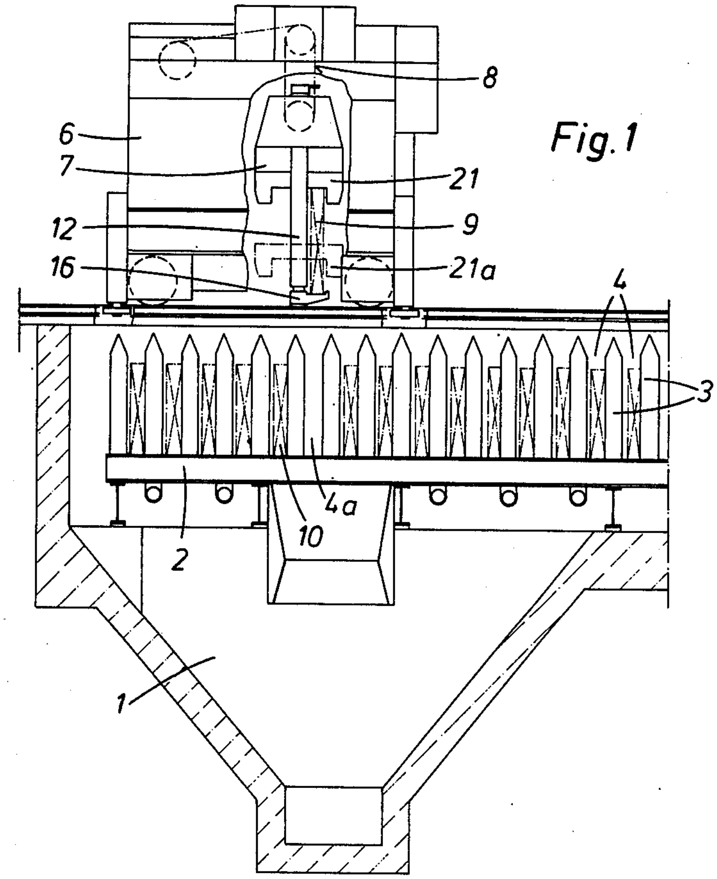
FIG. 1 illustrates a section of a slab cooling pit having a mobile crane which is displaceable transversely to slabs located in the cooling pit and which embodies the gripping device.

FIG. 1 illustrates a part of a water basin 1 of a slab cooling pit in which a storage frame 2 is located. This storage frame 2 has a plurality of upwardly directed spikes 3 which are supported on transverse beams 2*a* and which form compartments 4 for depositing therein slabs on one edge thereof in an upright position. Gripper elements of a gripping device can travel between the transverse beams 2*a* supporting the spikes 3 for the purpose of lowering the slabs into the water basin and lifting them out again.

The gripping device according to the invention for handling the slabs is disposed in a mobile crane 6 which is displaceable transverse to the slabs disposed on the storage frame 2 and has a vertically adjustable bridge structure 7 which extends in the whole region of the cooling pit over the length of the slabs stored therein. The bridge structure 7 is suspended from cable pulleys 8 which can be actuated by means of a drive (not illustrated in detail) for vertically displacing the bridge structure 7. In FIG. 1 the gripping device according to the invention which is still to be described in detail supports a slab 9 which is to be deposited in a compartment 4*a* of the storage frame 2, and during the return stroke of the bridge structure 7 a slab 10 is to be lifted out of the adjacent compartment located on the left in the Figure.

Figure 2:
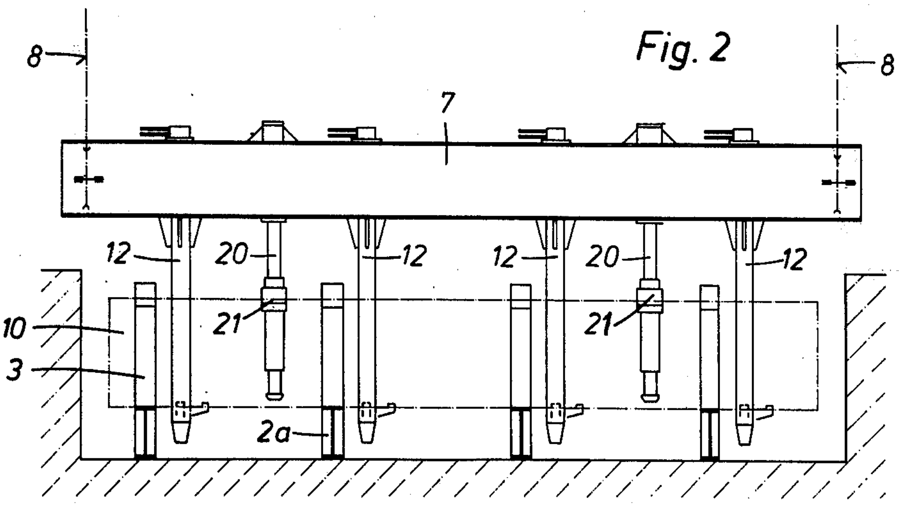
FIG. 2 is a view of a bridge structure which is vertically displaceable in the mobile crane, together with the gripper elements supported by the bridge structure.

FIG. 2 is a diagrammatic illustration of a longitudinal section through the cooling structure parallel to the plane of the slab 10. The storage frame 2 is formed in the present example by four transverse beams 2*a* which are disposed at a mutual spacing and support spikes 3 which form a plurality of compartments 4. For simplifying the illustration the mobile crane 6 has been omitted and only the bridge structure 7 which is vertically displaceable by the cable pulleys 8 and is part of the gripping device is illustrated. The bridge structure 7 supports in a common line of disposition four support rods 12 which are illustrated in detail in FIGS. 3 and 4, as well as two guide rods 20 having gravity operated holder members 21 which are freely movable in a vertical direction and which are illustrated in detail in FIG. 5.

Figures 3, 4, 4A, 5, 6:
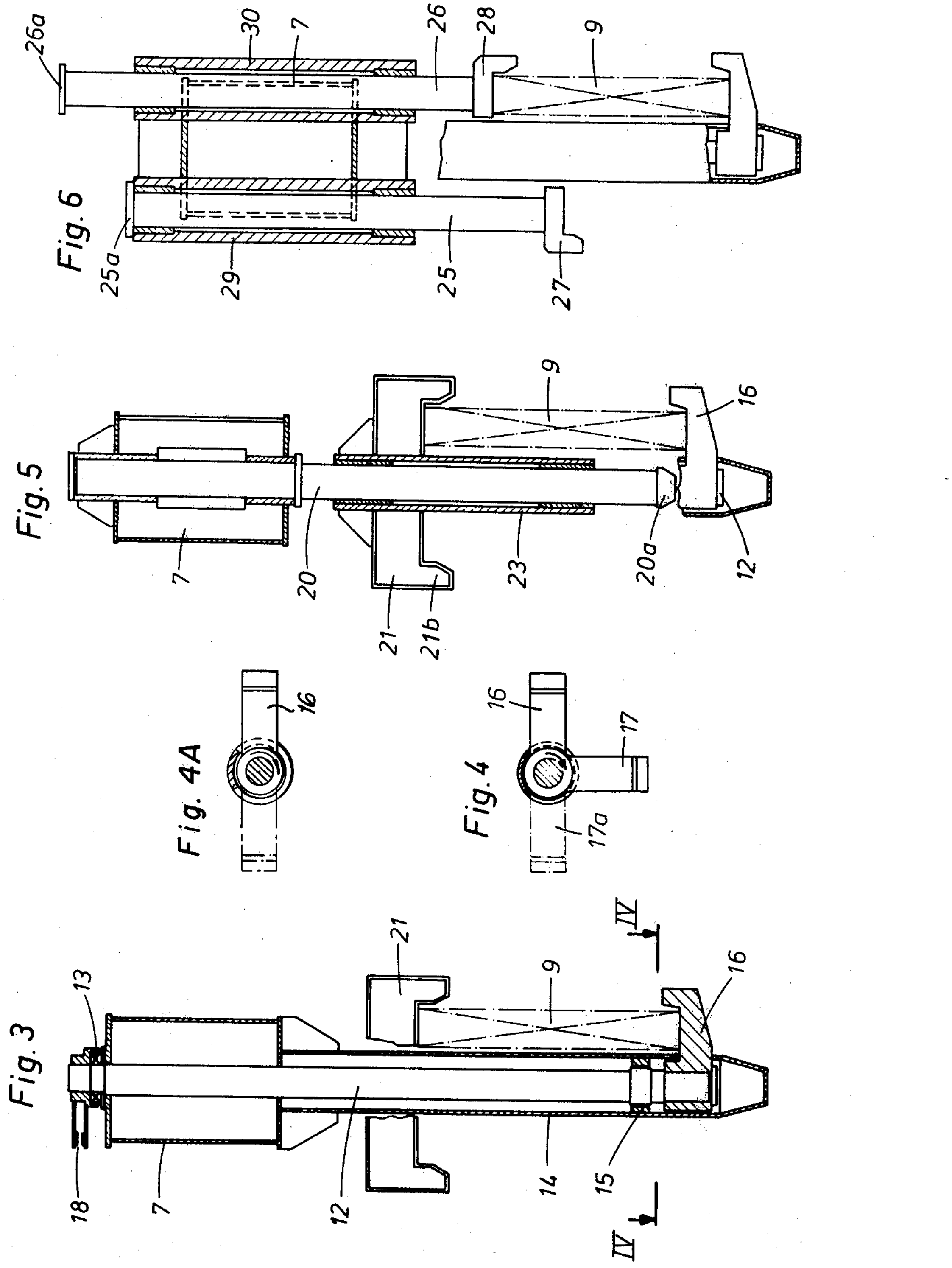
FIG. 3 illustrates a vertical section through the bridge structure and a support rod.
FIG. 4 illustrates a cross-section on the line IV—IV in FIG. 3.
FIG. 4A illustrates a modification to the feature shown in FIG. 4.
FIG. 5 illustrates a cross-section through the bridge structure and the guide for a double acting holder member.
FIG. 6 is a vertical section through an alternative embodiment illustrating the guide for two independently displaceable gravity operated holder members.

With reference to FIG. 3, each support rod 12 is supported in the bridge structure 7 by means of a pressure bearing 13, and its lower end portion is secured by a bearing 15 to the lower end of a sleeve 14 extending from the bridge structure 7. The lower end portion of each support rod carries furthermore a formed member having two cantilever-like support members 16 and 17 which are angularly offset one relative to the other by 90° (FIG. 4). The lower end of the sleeve 14 is apertured to permit the support members 16 and 17 to extend therethrough as may be seen from FIG. 4.

Each support rod 12 is rotatable through 90° by means of an adjuster lever 18 attached to the upper end of each rod 12 in order to permit the support member 17 to be moved into the position 17*a* illustrated by a dash dotted line and the support member 16 into the position previously occupied by the support member 17. In this way it is possible after lowering the bridge structure 7 to deposit a slab 9 (see also FIG. 1) which rests on the support members 16 of at least two support rods 12, by a 90° displacement of the support rods 12, thereby displacing the support member 17 into the position 17*a* and then to remove an adjacent slab 10 during the subsequent upward stroke after the bridge structure 7. Obviously this double function can be obtained also with a single cantilever-like support member 16 when the support rods 12 are arranged to be rotated through 180° as shown in FIG. 4A.

FIG. 3 also illustrates a holder member 21 which is constructed in a mirror-symmetrical manner and which is part of the gripper element which is disposed between the support rods 12 on the same line of disposition therewith, as illustrated in detail in FIG. 5. Only one such gripper element may be provided. However, the present constructional example is provided with two gripper elements because different zones of the cooling pit may be selectively operated. The gripper element consists of a guide rod 20 which is fixed in the bridge structure 7 and which is provided at its lower end with an abutment collar 20*a*. A sleeve 23 can slide freely on this guide rod 20 and is rigidly connected to the mirror-symmetrical holder member 21. FIG. 5 illustrates further the lower end of a support rod 12 which is disposed behind the plane of the drawing and which has a cantilever-like support member 16 on which a slab 9 rests.

The sleeve 23 rests normally on the abutment collar 20*a* owing to its own weight and assumes thereby the position 21*a* as illustrated in FIG. 1. It is obvious that upon lowering the bridge structure 7 the holder member 21 is deposited on the upper end face of a slab 9 supported by the support members, while the guide rod 20 together with the support rods 12 continue to move downwards. Owing to the weight of the holder member 21 and the sleeve 23 and in particular because of the respective downwardly directed projection 21*b* which engages behind the outer surface of the slab 9 the holder member 21 ensures that the slab 9 which is engaged from below by the support member 16, is secured against tilting during its transport. The slab cannot tilt towards the side opposite the projection 21*b* because this is prevented by the support rods 12.

In the constructional example according to FIG. 5 the holder member 21 is mirror-symmetrical for the reason that in accordance with the double function previously referred to it is also intended to secure in its position a slab which is lifted out of an adjacent compartment. Therefore, the holder member has a dimension transverse to the slab which extends over two adjacent slabs, and is mirror-symmetrical relative to the line of disposition of the support rods 12.

The manner of working of the gripping device described heretofore is as follows:

For the purpose of receiving a slab the mobile crane 6 is displaced to a position outside the cooling pit into the region of a turning device which, referred to FIG. 1, is located for example on the left hand side of the cooling structure, and which lifts the hot slabs off a roller conveyor and places them in an upright position. Thereupon the bridge structure 7 with the gripper elements mounted thereon is lowered in such manner that the support rods 12 are located on one side, referred to the drawings, e.g., on the left hand side, of the hot slab to be received. Prior to lowering, the cantilever-like support members 16 are rotated into the position of the support members 17, i.e. the position in which they extend parallel to the plane of the slab (FIG. 4). During the lowering operation the two holder members 21 are deposited on the slabs. After the support members 16 have been rotated back into the gripping position shown in FIG. 1 the bridge structure is raised again whereby one slab 9 is removed upwardly. Thereupon the mobile crane 16 travels over a free compartment 4a of the storage frame 2 and then the bridge structure 7 is lowered again. When the hot slab 9 enters into the compartment 4a (FIG. 1) and is deposited on the tranverse beams 2a the unoccupied arm, in FIG. 5 the left hand arm of the holder member 21 is simultaneously deposited on the adjacent cold slab 10 to be removed. This slab 10 must have approximately the same stored height as the slab 9 being deposited. Small differences of height are compensated by the length of the downwardly directed projections 21b of the holder member 21 (FIG. 5), the length being suitably chosen to prevent tilting of slabs during lifting even when there is no immediate contact between the upper end face of a slab and the holder member 21.

The bridge structure 7 is lowered so far that the support members 16 are free to be rotated through 90°. After such a rotation the support members 17 are located under the slab 10 to be removed whereupon the bridge structure 7 can be driven upwards again. If the stored height of the billet 10 is less than that of the deposited slab 9 the respective arm or arms of the holder member or members 21 engage the upwardly moving slab 10 after the start of the lifting movement of the support rods 12. In this phase the slab 10 is still securely held against tilting by the adjacent spikes 3 of the storage frame 2. After completion of the lifting movement, the mobile crane 6 travels with the cold slab 10 across the cooling pit to the right hand edge thereof where the removed slab 10 is deposited into a further turning device (not illustrated).

If considerable differences in the width of the slabs to be handled, i.e., the stored height thereof, must be allowed for it is advisable to utilize a gripper element according to FIG. 6 instead of the gripper element according to FIG. 5. In this case two axially displaceable slide rods 25, 26 are mounted in bearing sleeves 29, 30 attached to the bridge structure 7 at a spacing corresponding to that of adjacent slabs and each carries at its lower end a holder member 27, 28. The holder members 27, 28 are mutually mirror-symmetrically arranged. The slide rods 25, 26 carry at their upper end abutment collars 25a and 26a, respectively, which are deposited by their own weight on the bearing sleeves 29 and 30 of the bridge structure 7 as long as the holder members 27, 28 are not located on a slab. In FIG. 6 the slide rod 25 is obviously located in such a lowest end position, whereas the slide rod 26 is shown in a relatively raised position and in engagement with a slab 9. This alternative construction of a gripper element provided with separately movable holder members 27, 28 permits for example the holder member 27, during the lowering of a slab 9 to engage an adjacent slab to be removed the stored height of which is considerably less than that of the slab 9 being deposited. In this case the slab to be removed is securely held against tilting right from the start of the lifting process and is independent of the position securing effect provided by the spikes 3 of the storage frame 2.

What is claimed is:

1. A gripping device for handling slabs to be deposited side by side in storage means, the device comprising:

a. a mobile crane at least part of which is disposed over the storage means and which is displaceable in a direction transverse to slabs stored therein;

b. a bridge structure vertically displaceable relative to said mobile crane;

c. at least two gripper means carried by said bridge structure and disposed at spaced locations with respect to the stored slabs, both gripper means being disposed in a plane substantially parallel to the planes of the slabs;

d. each gripper means including a vertical support rod which can be lowered into the storage means, each vertical support rod having at least one controllable load support member at the lower end thereof for selectively engaging under or releasing the slabs;

e. vertical guide rod means coupled with said bridge structure and profiled holder means mounted on said guide rod means for free vertical movement relative to said bridge structure between a low end position defined by an abutment on said guide rod and a high end position defined by the height of the slab being handled, the storage means including a plurality of compartments for holding slabs in generally parallel array, the profiled holder means being of such dimension as to extend transversely over two adjacent compartments whereby said holder means prevents tilting of the slabs when supported by said gripper means and whereby, upon lowering of said bridge structure, said profiled holder means engages an upper end of the slabs to be handled.

2. A gripping device according to claim 1, wherein the controllable load support members are rigidly disposed in a cantilever manner on the support rods which, in turn, are mounted in the bridge structure and which are rotatably adjustable.

3. A gripping device according to claim 1 wherein a load support member is carried in cantilever manner on each support rod and is rotatably adjustable through 180°, said guide rod for said profiled holder assembly means being disposed in generally the same plane as said support rods, said holder means extending transversely with respect to the stored slab and with respect to the plane of said support rods and said holder means being symmetrical relative to its associated guide rod.

4. A gripping device according to claim 1 wherein each support rod carries in cantilever manner two load support members mutually offset by 90°, each support rod being rotatably displaceable through 90° and wherein said profiled holder means extends transversely with respect to the stored slabs and with respect to the plane of said support rods.

5. A gripping device according to claim 1 wherein said guide rod is mounted on said bridge structure and said profiled holder means is slidably mounted via a sleeve on said guide rod, said guide rod having an abutment collar at its lower end.

6. A gripping device according to claim 1 wherein said vertical guide rod means includes a pair of guide rods, each provided with a profiled holder means, disposed on opposite sides of the plane of said support rods so that holder means are provided for each of two adjacent slabs, said pair of guide rods being slidably mounted in said bridge structure and being provided at their upper ends with an abutment collar.

7. A gripping device according to claim 1 wherein the profiled holder means includes downwardly directed projections for embracing a slab at a surface thereof which faces away from said support rods.

* * * * *